Feb. 7, 1961

H. E. SCHULTZ 2,971,166

TRANSISTOR POWER INVERTER

Filed Dec. 29, 1958

INVENTOR.
Harry E. Schultz
BY

His Attorney

Feb. 7, 1961 H. E. SCHULTZ 2,971,166
TRANSISTOR POWER INVERTER
Filed Dec. 29, 1958 2 Sheets-Sheet 2

INVENTOR.
Harry E. Schultz
BY
Ernest W. Pegree
His Attorney

United States Patent Office 2,971,166
Patented Feb. 7, 1961

2,971,166

TRANSISTOR POWER INVERTER

Harry E. Schultz, Euclid, Ohio, assignor to General Electric Company, a corporation of New York Filed Dec. 29, 1958, Ser. No. 783,338

4 Claims. (Cl. 331—113)

This invention relates to a transistor power inverter using semiconductor devices or transistors for obtaining an alternating current output from a direct current supply and is more particularly concerned with controlling the frequency in such converters.

Transistor power inversion circuits provide a convenient means for obtaining alternating current from a direct current supply and are finding increasing use on account of their high efficiency. One well known inversion circuit, sometimes referred to as a ferroresonant transistor oscillator, utilizes a saturating transformer having a core with a rectangular hysteresis characteristic as the frequency determining element. The D.C. supply voltage or battery is switched with alternating polarity across the primary winding of a saturable transformer by the transistors. This produces a substantially rectangular wave pattern whose half-cycle period is proportional to the time required for the transformer core to become magnetically saturated after each reversal of the conducting conditions of the transistors. The time required is inversely proportional to the magnitude of the voltage of the D.C. supply or battery source. Consequently the frequency of the alternating voltage output is directly proportional to the battery voltage. For some applications, this is a disadvantageous characteristic. For instance in a high frequency discharge lamp operating circuit where a reactive ballast is used to limit the discharge current through a fluorescent lamp load, a change in output frequency will cause a change in lamp current.

Accordingly the primary object of the invention is to provide an improved transistorized power inverter for producing an alternating current output from a direct current supply and which is characterized by its frequency stability.

Another object of the invention is to provide a transistorized inversion circuit wherein the output frequency is substantially independent of the magnitude of the direct current supply voltage.

Other objects and advantages of the present invention will become apparent from the following description thereof as developed in connection with the detailed description of embodiments illustrating its principles. The features of the invention believed to be novel will be more particularly pointed out in the appended claims.

Figure 1:
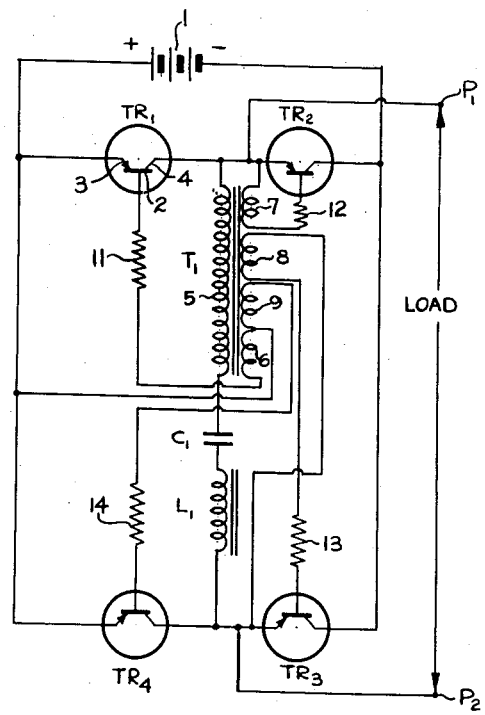
Fig. 1 is a schematic circuit diagram of a transistor inverter circuit in accordance with the present invention utilizing an inductance-capacitance frequency determining network and four transistors for switching the D.C. supply.

In accordance with the invention a resonant inductance-capacitance control or driving circuit is used to determine the operating frequency so that it is essentially independent of variations in the direct current supply voltage or of load changes.

In the inverter circuits illustrated in the drawings wherein like reference numbers designate corresponding elements in the several figures, the direct current supply or sourse is represented as a battery 1. Of course any other source of direct current may likewise be used, including for instance a rectifier operating from the usual 115–120 volt, 60 cycle alternating current supply.

The semiconductive switching devices or power transistors designated generally TR in the drawings may suitably be of the junction type wherein a body of semiconductive material such as silicon or germanium is provided with three distinct regions by means of controlled impurities to establish rectifying junctions between regions of opposite conductivity types. Suitable contacts are made to the terminal regions to provide the emitter and collector electrodes and a low-resistance contact is made to the semiconducting body to provide the base electrode. By applying a forward bias to the emitter base junction (making the base electrode negative with respect to the emitter electrode in the case of a p-n-p transistor), a saturated condition of the transistor occurs wherein the resistance between emitter and collector electrodes becomes relatively small. By applying a reverse or back bias between emitter and base electrodes, the transistor is cut off and the resistance between emitter and collector electrodes becomes relatively very large.

The transistors $TR_1$, $TR_2$, $TR_3$, and $TR_4$ are of the p-n-p junction type. As shown for $TR_1$, the symbolic representation indicates the base electrode at 2, the emitter electrode at 3, and the collector electrode at 4. The primary function of the transistors is to alternately switch the direct current supply or source 1 across opposite sides of a load connected between output points $P_1$ and $P_2$ which are connected to the junctions of the transistor pairs $TR_1$, $TR_2$ and $TR_3$, $TR_4$. The emitter-collector electrode paths of the transistors in each pair are connected in series across the source 1. A control circuit comprising transformer $T_1$, capacitor $C_1$, and inductor $L_1$ controls the conducting states of the transistors to alternately turn on transistors $TR_1$ and $TR_3$ while transistors $TR_2$ and $TR_4$ are turned off, and then to turn on transistors $TR_2$ and $TR_4$ while transistors $TR_1$ and $TR_3$ are turned off. When transistor $TR_1$ is turned on, output terminal $P_1$ is connected through its low resistance emitter-collector electrode path to the positive side of the battery; simultaneously output terminal $P_2$ is connected through the low-resistance emitter-collector path of transistor $TR_3$ to the negative side of the battery. At such time the emitter-collector paths of transistors $TR_2$ and $TR_4$ have a high resistance and are substantially nonconducting. When the conductivity states of the transistors are reversed, terminal $P_1$ becomes effectively connected to the negative side of the battery and terminal $P_2$ to the positive side. Thus a rectangular alternating waveform of voltage is produced across output terminals $P_1$, $P_2$ as represented at $e_0$ to $e_3$ in Fig. 5. The alternating voltage level at the output terminals may be raised or lowered in conventional fashion through a transformer or autotransformer interposed before the load.

The manner of determining the frequency of the rectangular wave pattern output voltage in accordance with the invention will now be explained. Transformer $T_1$ has a primary winding 5 which is connected in series with capacitor $C_1$ and inductor $L_1$ across output terminals $P_1$ and $P_2$ to form a control circuit. The transformer has secondary windings 6 to 9 which are connected in series with current regulating resistors 11 to 14 between the emitter and base electrodes of transistors $TR_1$ to $TR_4$ respectively. The secondary windings 6 to 9 are tightly coupled to the primary winding 5 and transformer $T_1$ may be substantially without leakage reactance so as to reflect only resistance into the control circuit. However if the transformer does reflect inductance into the control circuit, such reflected inductance becomes part of the total inductance in the control circuit.

Capacitor $C_1$ and inductor $L_1$ are chosen to be series resonant at the desired frequency of operation of the inverter. The natural frequency of oscillation of the control circuit is given by the relationship:

$$2\pi f = \sqrt{\frac{1}{LC} - \frac{R^2}{4L^2}}$$

where $f$ = the natural resonant frequency of the circuit,
$L$ = total inductance in the circuit,
$C$ = total capacitance in the circuit,
$R$ = total resistance in the circuit.

Provided $1/LC$ is greater than $R^2 4/L^2$, the circuit will be oscillatory and if $1/LC$ is much greater than $R^2/4L^2$, the frequency of oscillation will be determined substantially by the relationship:

$$2\pi f = \sqrt{\frac{1}{LC}}$$

The latter relationship is that preferably obtaining in accordance with the invention and wherein L and C are determined substantially by the values of capacitor $C_1$ and inductor $L_1$. Under these conditions, the control circuit is shock-excited into oscillation at each switching action of the transistors whereupon it causes the next switching action of the transistors at a time interval one-half cycle later according to its natural resonant frequency.

Figure 5:
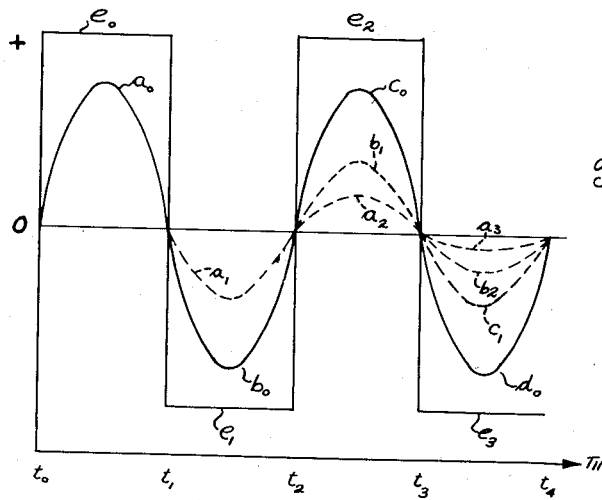
Fig. 5 shows an oscillatory voltage waveform related to the circuits of the invention.

The foregoing statement may be better understood by reference to Fig. 5. The rectangular voltage waveforms $e_0$, $e_1$, $e_2$, $e_3$ illustrate the voltage applied across the oscillatory circuit comprising primary 5 of transformer $T_1$, capacitor $C_1$ and inductor $L_1$. At time $t_0$ when the voltage is stepped up to level $e_0$, a transient oscillatory current is induced in the RLC circuit whose first half-cycle is represented by solid curve $a_0$. If nothing further happened, subsequent oscillations would decrease exponentially in amplitude as represented by dotted line curve $a_1$, $a_2$, $a_3$ etc. However at time $t_1$ when the first half-cycle is ending, the voltages induced in secondary windings 6 and 9 and which are applied to the base electrodes of transistors $TR_1$ and $TR_3$ change from negative to positive relative to the emitter electrodes. The voltages induced in secondary windings 7 and 9 are likewise reversed and cause transistors $TR_2$ and $TR_4$ to be turned on. As a result, the voltage applied across the RLC driving or control circuit changes suddenly from $e_0$ to $e_1$ and this starts off a new transient oscillation of full amplitude in the driving circuit whose first half-cycle is represented by solid line curve $b_0$. Again if nothing further happened, this transient would continue as oscillations of diminishing amplitude represented by dotted line curve $b_1$, $b_2$ etc. However the switching action of the transistors at the end of each first half-cycle restores the oscillations to full amplitude again so that the oscillatory current through the RLC circuit follows the waveform $a_0$, $b_0$, $c_0$, $d_0$ etc. Thus the frequency of oscillation of the RLC driving or control circuit, and likewise of course the frequency of the rectangular output waveform of the inverter, is determined by the constants of the RLC control circuit, primarily by the LC portion thereof, and is substantially independent of the supply voltage or of the load conditions.

Figure 2:
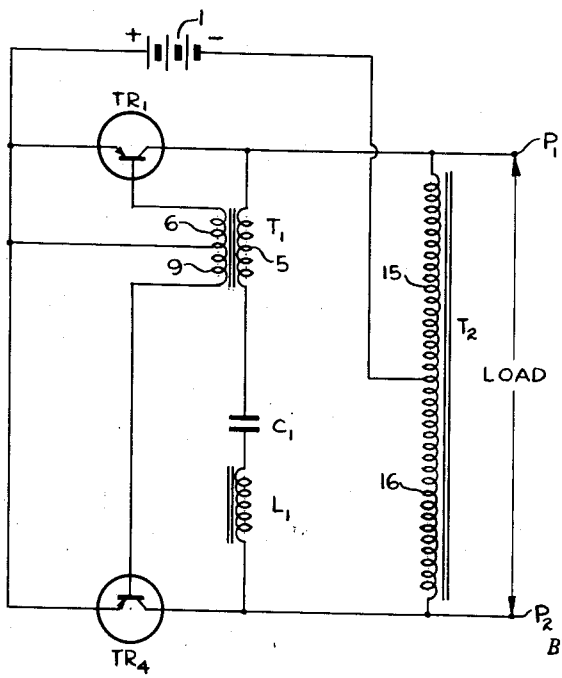
Fig. 2 is a variant using a center-tapped transformer and two transistors for switching.

The circuit of Fig. 2 represents a variant wherein only two transistors $TR_1$ and $TR_4$ are used and wherein the negative side of battery 1 is connected to the center tap of an autotransformer $T_2$ connected across output terminals $P_1$, $P_2$. With this arrangement, the operation of the transistors cause the supply voltage to be alternately switched across the halves 15 and 16 of autotransformer $T_2$ so that an alternating voltage of rectangular waveform and of twice the amplitude of the D.C. supply voltage is developed across the output terminals $P_1$, $P_2$. The resonant operation of the RLC driving or control circuit is of course the same as has been previously described with reference to Fig. 1 and determines the output frequency of the inverter circuit substantially independently of the supply voltage and of the load conditions. It will be appreciated that in the circuit of Fig. 2 the inverse voltage across the transistors is double the direct current supply or battery voltage, so that for the same supply voltage and load conditions it is necessary to use transistors of double the inverse voltage capacity of those of Fig. 1. If desired, the output may be taken by inductive coupling of a secondary winding to primary winding 15, 16 of transformer $T_2$; also such secondary winding may have leakage reactance for regulating the current to a negative resistance characteristic load such as a discharge lamp.

Figure 3:
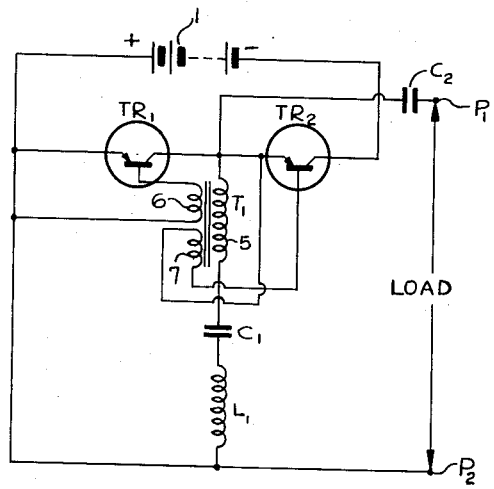
Fig. 3 is another variant using two transistors only and a D.C. blocking capacitor for switching.

In the variant of Fig. 3, the positive side of the battery is directly connected to output terminal $P_2$ and the transistors $TR_1$ and $TR_2$ alternately switch output terminal $P_1$ through direct current blocking capacitor $C_2$ from the negative to the positive side of the battery. Thus the voltage applied across blocking capacitor $C_2$ and the load, may be viewed as a series of unidirectional pulses of maximum amplitude substantially equal to the battery or direct current supply voltage. However since capacitor $C_2$ cannot transmit direct current, it charges up to an average value equal to half the battery voltage and the load thus effectively receives an alternating current voltage of rectangular waveform and of an amplitude equal to half the battery voltage. The operation of the RLC resonant driving or control circuit which is shock-excited into oscillation at each switching action of the transistors occurs in substantially the same fashion as has been previously described with reference to Fig. 1.

In the circuits which have been described up to the present, the driving transformer $T_1$ has been described as coupling resistance only into the RLC driving circuit. However it is also possible for the driving transformer to have leakage reactance in which case such reactance would form a part of the inductance in the RLC control circuit.

Figure 4:
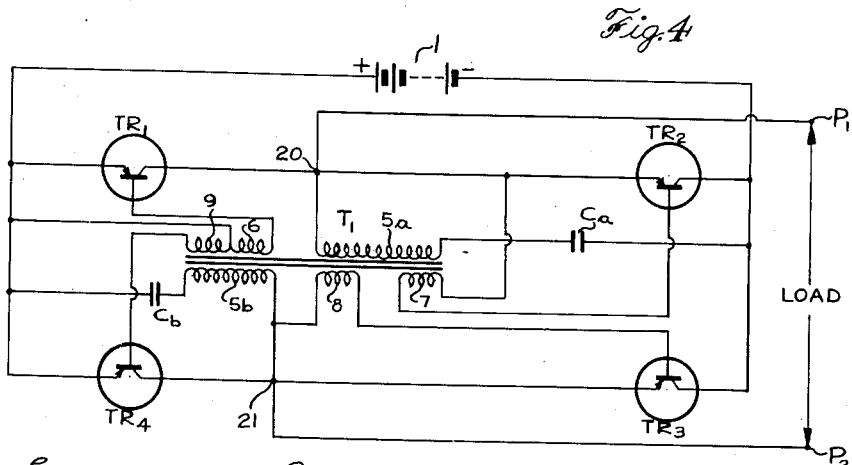
Fig. 4 shows yet another modification of the circuit of Fig. 1.

The inverter circuit of Fig. 4 illustrates another variant of the invention similar in its general configuration to that of Fig. 1. In this arrangement the control transformer $T_1$ is provided with two separate primary windings 5a and 5b each with substantial leakage reactance and the RLC control circuit is split into two parts. One part comprising primary winding 5a and capacitance $C_a$ is connected between the negative side of the battery and junction point 20 connected to output terminal $P_1$. The other part comprising primary winding 5b and capacitor $C_b$ is connected between the positive side of the battery and junction point 21 connected to output terminal $P_2$. The purpose of this configuration is to obtain a transient charging current to capacitors $C_a$ and $C_b$ when the D.C. supply voltage or battery is connected to the unit. During normal operation, capacitors $C_a$ and $C_b$ will have an average voltage equal to one-half the direct current supply voltage. When the direct current supply is applied to the circuit, the charging current to these capacitors is sufficient to start the circuit oscillating even under loaded conditions. Once oscillations have started, the frequency is determined through the natural resonant frequency of the RLC control circuit, the inductance in each branch being provided by the leakage reactance of the primary windings 5a and 5b.

It will be understood that the various specific circuits which have been described herein are intended as exemplary and not as limitative of the invention. Likewise whereas the invention has been described using p-n-p type transisitors, n-p-n type transistors may equally well be used with appropriate modification of the source potential with respect to the other circuit elements. The appended claims are therefore intended to cover any such modifications coming within the true spirit and scope of the invention.

What I claim as new and desire to secure by Letters Patent of the United States is:

1. An inverter system comprising a direct current source, a pair of alternating current output terminals for supplying a load circuit, two pairs of transistors each having base, emitter and collector electrodes, each pair of transistors having their emitter-collector electrode paths connected in series across said source and the junctures of the transistors in each pair forming said output terminals, means for applying biasing potentials from the emitter to the base electrodes of said transistors for alternately switching on one transistor in each pair to apply the source voltage across the load circuit in alternating polarity, said means comprising a control circuit including a transformer having a primary winding connected in series with an inductance-capacitance oscillatory circuit across said output terminals, and secondary windings in said transformer connected to the base electrodes of said transistors for applying the voltages induced therein to alternately turn on said transistors at the natural resonant frequency of said oscillatory control circuit.

2. An inverter system comprising a direct current source, a pair of alternating current output terminals for supplying a load circuit, a pair of transistors each having base, emitter and collector electrodes, connections from one side of said source through the emitter-collector electrode paths of said transistors to said output terminals, a center-tapped transformer connected across said output terminals and having its center tap connected to the other side of said source, and means for applying biasing potentials from the emitter to the base electrodes of said transistors for alternately switching on said transistors to apply the source voltage between said center tap and each output terminal alternately, said means comprising a control circuit including a transformer having a primary winding connected in series with an inductance-capacitance oscillatory circuit across said output terminals, and secondary windings in said transformer connected to the base electrodes of said transistors for applying the voltages induced therein to alternately turn on said transistors at the natural resonant frequency of said oscillatory control circuit.

3. An inverter system comprising a direct current source, a pair of alternating current output terminals for supplying a load circuit, a pair of transistors each having base, emitter and collector electrodes, the emitter-collector electrode paths of said transistors being connected in series across said source, a direct current blocking capacitor connecting the juncture of said transistors to one output terminal, a direct connection from one side of said source to the other output terminal, and means for applying biasing potentials from the emitter to the base electrodes of said transistors for alternately switching on said transistors to develop an alternating voltage component at said output terminals, said means comprising a control circuit including a transformer having a primary winding connected in series with an inductance-capacitance oscillatory circuit between said juncture and one side of said source, and secondary windings in said transformer connected to the base electrodes of said transistor for applying the voltages induced therein to alternately turn on said transistors at the natural resonant frequency of said oscillatory control circuit.

4. An inverter system comprising a direct current source, a pair of alternating current output terminals for supplying a load circuit, two pairs of transistors each having base, emitter and collector electrodes, each pair of transistors having their emitter-collector electrode paths connected in series across said source and the junctures of the transistors in each pair forming said output terminals, means for applying biasing potentials from the emitter to the base electrodes of said transistors for alternately switching on one transistor in each pair to apply the source voltage across the load circuit in alternating polarity, said means comprising a control circuit including a transformer having a pair of primary windings, each primary winding being connected in series with a capacitance and equivalent inductance between one of said junctures and one side of said source to form an inductance-capacitance oscillatory circuit, and secondary windings in said transformer connected to the base electrodes of said transistors for applying the voltages induced therein to alternately turn on said transistors at the natural resonant frequency of said oscillatory circuits.

No references cited.